United States Patent [19]
Silhengst et al.

[11] Patent Number: 6,078,439
[45] Date of Patent: Jun. 20, 2000

[54] OPTICS UNIT FOR SIGNAL, TRAFFIC AND DISPLAY EQUIPMENT, ARRANGEMENT OF THE SAME THEREIN AND METHOD THEREFORE

[75] Inventors: Franz Silhengst, Ollern; Friedrich Peter Hofstadler, Linz; Alexander Otto, Bisamberg, all of Austria

[73] Assignee: Swarco Futurit Verkehrssignalsysteme Ges.mbH, Austria

[21] Appl. No.: 09/233,990

[22] Filed: Jan. 19, 1999

[30] Foreign Application Priority Data

Jan. 19, 1998 [AT] Austria ..................................... A64/98

[51] Int. Cl.⁷ .............................. G02B 7/02; G09F 17/00; F21V 5/00
[52] U.S. Cl. .............................. 359/819; 40/602; 362/559
[58] Field of Search .............................. 359/819; 40/600, 40/602, 608; 362/455, 559, 581

[56] References Cited

U.S. PATENT DOCUMENTS 5,563,588 10/1996 Belfer ....................................... 340/907

FOREIGN PATENT DOCUMENTS

| 757 268 | 2/1997 | European Pat. Off. . |
| 0757268 | 5/1997 | European Pat. Off. .......... G02B 7/02 |
| 41 04 706 | 8/1992 | Germany . |
| 61-189510 | 8/1986 | Japan . |
| 61-189511 | 8/1986 | Japan . |
| 61-189512 | 8/1986 | Japan . |

*Primary Examiner*—Georgia Epps
*Assistant Examiner*—David Seyrafi
*Attorney, Agent, or Firm*—Jones & Askew

[57] ABSTRACT

A manner of mounting optical elements in the front plate of an alternating traffic sign makes possible an easily-cleaned, flat or smooth outer surface and guarantees an exact alignment of all lens elements with simultaneous sealing. An optics housing is pressed into a hole of the front plate constricted by a lens element so that the hole constriction is embedded by plastic material deformation and results in a form-fit, exact, tight and permanent connection. Additionally, a tool for the precise production of the installation holes is presented.

16 Claims, 2 Drawing Sheets

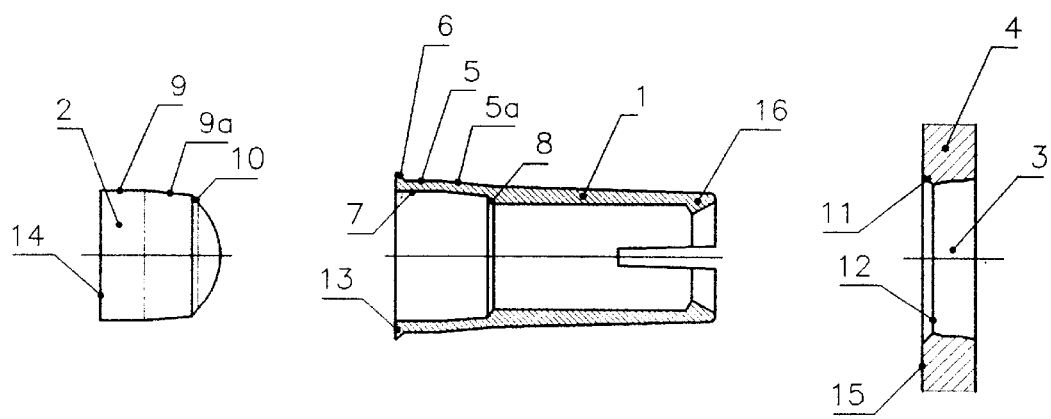
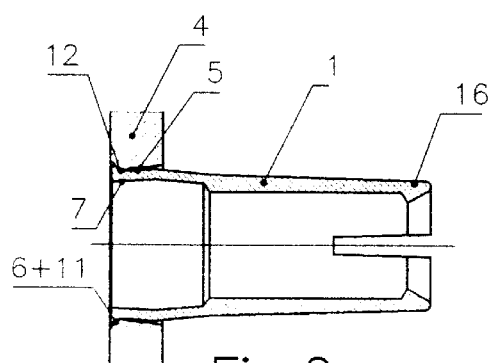
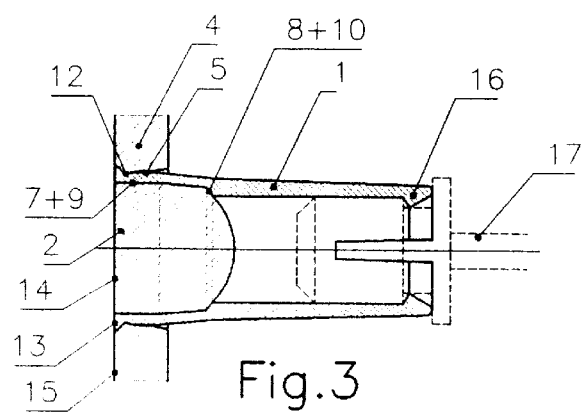
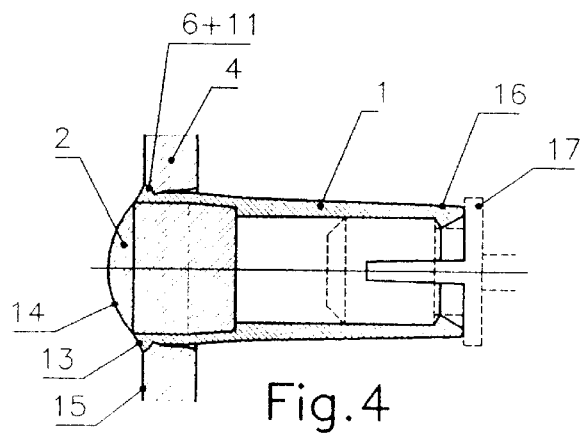
Fig. 1
Fig. 2
Fig. 3
Fig. 4

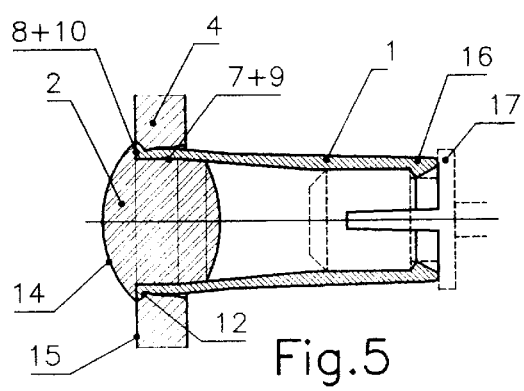
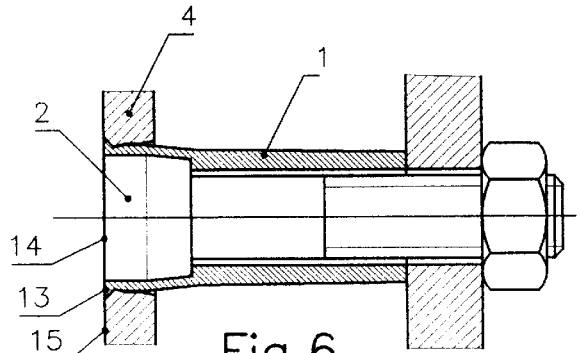
Fig.5  Fig.6
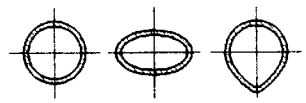
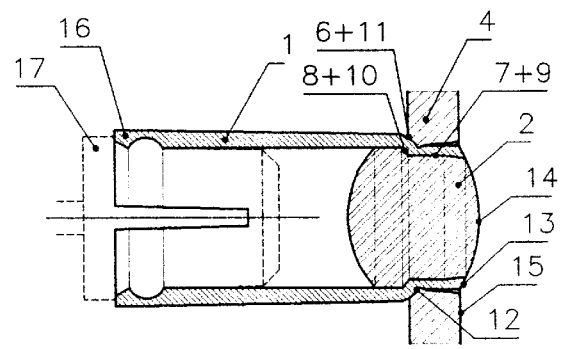
Fig.7  Fig.8
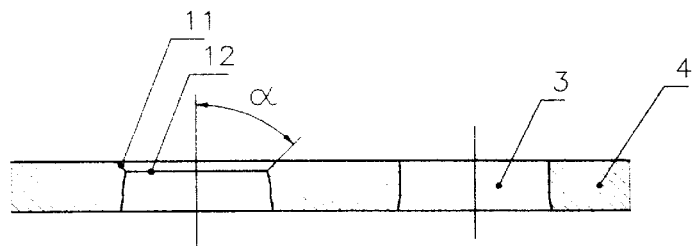
Fig.9
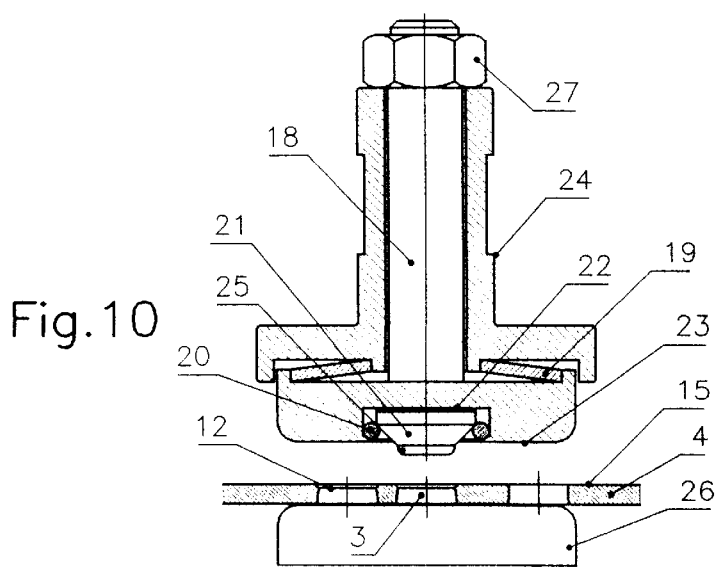
Fig.10

OPTICS UNIT FOR SIGNAL, TRAFFIC AND DISPLAY EQUIPMENT, ARRANGEMENT OF THE SAME THEREIN AND METHOD THEREFORE

FIELD OF THE INVENTION

The invention pertains to all signal, traffic and display equipment which displays the information by means of an arrangement of dots of light.

BACKGROUND OF THE INVENTION

Either the concentrated light of one or more glow lamps is distributed by means of optical fibers ("optical waveguide") onto a number of optical elements, usually of identical construction and also called "optics," "light spots" or "lenses," or one or more light sources, preferably LEDs, which can be triggered individually or in groups, are installed in each optical element. The optical elements are arranged on the front side of a so-called "matrix plate" such that the light spots belonging to a light source or light source group form a symbolic representation or alphanumeric characters and exhibit a shared radiation direction and shared radiation characteristics.

The equipment with the highest technical requirements finds use particularly in traffic signaling, wherein, as a rule, it is possible to select between different symbols and texts by switching the light spots ("alternating traffic signs"), or an arbitrarily programmable display or graphic can be generated by individual triggering of the light spots.

The mechanical requirements consist, in particular, in the highest stability against the effects of weather and temperature, tightness, uniformity of the individual light spots, resistance to wind stress, ease of cleaning, etc. The satisfaction of these demands depends in the greatest part on the type of mounting of the individual optical elements in the matrix plate of the equipment.

If sealing of the equipment was previously brought about by a pane placed in front of it, a model without a front pane has established itself today for many reasons. For that reason, in particular, the absolutely tight installation of the optical elements is required.

Additionally, there has been a desire in recent times for equipment which is as smooth at the front as possible, so that the display can be easily cleaned and no dirt can stick to it.

Thus far, models have been known in which the optical elements are pressed or inset into holes in the matrix plate. The protection against dropout and the sealing is accomplished by the pressing itself, by adhesive, molding compound or mechanical retention elements and seals. Clean operation with adhesive and secure sealing make high demands on production, including personnel.

Also known are models where rubber sockets are snapped into holes in the matrix, into which in turn the optical elements are snapped. These models, however, exhibit a certain elasticity in their mounting, which expresses itself in a nonuniform angle of radiation.

Also known are models where the mounting is accomplished in the manner of a threaded fastener by means of gasket ring and nut. Thereby a larger spacing between adjacent optical elements becomes necessary as a rule.

Also known are models where optical elements are pressed in tightly and secured by elastic snap hooks. The construction of the snap hooks requires a complicated optical element housing, which is not very stable and not light-tight. Designs with a snap mechanism are also tied to a defined thickness of the matrix plate.

Finally, a dowel-like fastener is know, which holds and seals the lens by widening the optical element housing when pressed in EP 0 757 268 A1. This proven method, however, requires different housing and lens models for significantly different matrix thicknesses. It can also not be applied economically for optical elements recessed into the matrix plate because of the necessity of drilling the matrix holes.

What is sought is a mounting method which permits, in particular, a flush planar, economical mounting of the optical elements in the matrix, the mounting hole of which can be produced easily and rapidly on, in particular, a nibbling machine; which is functionally secure and insensitive to component and production tolerances and guarantees an exact positioning and alignment of each individual optical element; which permits a stable enclosed housing protecting the lens and screening out extraneous light as well as an arbitrary optical element diameter and as small a spacing as possible between adjacent optical elements; and which can be installed in matrix plates of a wide variety of thicknesses and is absolutely pressure-tight and insensitive to all common cleaning methods.

BRIEF SUMMARY OF THE INVENTION

This problem is solved according to the invention in that the optics housing has a cylindrical periphery adapted to the hole geometry and an insertion slope and a collar serving as a contact surface externally in the area of the matrix plate and, internally, preferably at least one cylindrical area in the area of the collar and the adjacent periphery as well as a stop surface for the lens element, in that the lens element features at least one cylindrical area with adjacent insertion slope and a stop surface in a geometry harmonizing with surfaces of the housing, as well as that the hole has a recess preferably produced by stamping with an edge narrowing the hole cross section, in that, furthermore, the collar lies against the stamping upon installation of the housing in the hole and in the process preferably also constricts the collar and periphery, and in that, in the subsequent pressing of the lens element into the housing, the stop surface comes to rest against the gradation surface 8, wherein, by an appropriate press-fit between the peripheral surfaces, the edge of the hole presses into the housing periphery, preferably by plastic deformation of the housing material, and thereby holds the optics unit in a form fit in the hole, positions it and seals it.

This is an adaptation of the principle of the well-known cutting ring sealing in the case of pipeline threaded fastenings, where a sealing groove is pressed into the softer pipe by the compression of the edge of a harder steel ring. Here the stamped-in edge located in the hole presses into the soft material by widening of the housing when the lens is pressed in.

BRIEF DESCRIPTION OF THE DRAWINGS

The invention is described in greater detail schematically on the basis of the figures below, wherein FIG. 1 shows the relevant materials before installation, FIG. 2 the installed housing, FIG. 3 the finally mounted optical element, FIGS. 4–8 embodiment variants, FIG. 9 a cross section through the installation holes before and after the stamping, and FIG. 10 a tool for producing the stampings.

DETAILED DESCRIPTION OF THE INVENTION

FIG. 1 shows the lens element, the housing and the axial hole in mutual axial arrangement. In the center, a cross section through the housing 1 is represented. At the left flat end face 13 it possesses a flange 6, which is followed by an essentially cylindrical section 5, which transforms into an insertion incline 5a. The inside 7 is likewise cylindrical in the area of the flange 6 and the periphery 5 so that, as a rule, a uniform wall thickness of the housing is achieved. There follows a gradation 8 which serves here as a stop surface for the lens element. The appearance of the housing in additional respects is no longer relevant to the present considerations. Snap hooks 16, which hold a light source or the end of an optical fiber 17, are shown.

The lens element 2 to the left of this likewise possesses a flat top side 14 which is adjoined by a cylindrical section 9. This has the same geometry as the section 7 of the housing 1. It transforms into an insertion slope 9a which is adjoined by the contact surface 10. A lens cup, whose function is not relevant here, forms the conclusion.

The hole 3 in the matrix plate 4 is adapted to the housing periphery 5 and possesses a conical recess 11 on the outer side 15 which was stamped in. Due to displacement of material, the stamping process forms an edge 12, which projects into the hole 3 and narrows it somewhat.

FIG. 2 shows the housing 1 pressed into the matrix plate 4. The flange 6 contacts the stamping 11 in the process. The hole edge 12 has likewise constricted the housing periphery 5 during pressing in, for which reason the interior periphery 7 has become smaller.

FIG. 3 shows the finish-mounted optics unit. When the lens element 2 is pressed into the housing 1, it presses, on the one hand, the housing 1 with the flange 6 firmly against the stamping 11, whereby it is precisely aligned, and, on the other, it presses the housing wall against the edge 12 by means of the insertion slope 9a and subsequently with the periphery 9. Because the housing material is softer in comparison to the matrix plate 4 and the lens element 2, it is plastically deformed or displaced by the high local pressure of the relatively pointed edge 12 and thereby tightly embeds the edge 12, even if it is rough or if flow lines pass through it. The housing material, however, likewise presses back onto the lens element 2, which cannot be pressed back out again because of the cylindrical surfaces 7+9 in the area of the edge 12 and therefore locks the arrangement in place. The high compressive strain here ensures a secure sealing of the lens element.

No additional strains in the material originate from the compression and subsequent expansion of the housing wall to the approximate original dimensions; only the inevitable crushing forces are present in the embedding of the edges.

With a suitable matching of the stamping 11, the flange 6 and the stops 8 and 10, the lens surface 14, the top side of the housing 13 and the front side of the matrix 15 form a plane.

The design is relatively insensitive to the usual component tolerances. Housing and the lens element are planned such that these parts can be deformed onto the sealing surfaces 5, 7 and 9 without a burr. The fluctuation tolerance of the plastic parts is minimal; tolerances in the stamping of the edge 12 and in the surface quality are taken up by the embedding process. The exact position and orientation of the optics units is determined, however, particularly by the precise execution of the hole stamping 11 and the exact flush alignment of hole and stamping. A special manufacturing tool for this purpose will be presented later. It is additionally helpful if the housing periphery 5 is fitted as closely as possible to the hole diameter, so that the undamaged part of the hole forms a guide for the housing. This guide becomes all the more favorable as the thickness of the matrix plate being employed increases. It is additionally advantageous if stamping 11, edge 12 and hole wall 3 exhibit the same profile at every point of the hole periphery, so that a secure contact of the flange 6 and a uniform embedding of the edge 12 take place, so that the associated slight extension of the housing turns out to be uniform and the housing is not askew.

It goes without saying that the mutual spacing of the optics units can be kept that much smaller the smaller the stamping is selected to be. The spacing is also dependent, however, on the diameter of the hole, the geometry of the stamping, as well as the thickness and material of the matrix plate.

For a very small spacing of the optics units, it is possible, in particular, during punching to distort the adjacent hole. Here an alternating punching or stamping process applied several times can help.

An automated assembly is easily possible, since pressing processes take place only at those matrix positions which are accessed for the hole punching and stamping.

It is obvious that the mounting method as presented is independent of the size of the optics units or the thickness of the matrix plate, because only the outermost part of the hole periphery with the stamped-in recess 11 and the retaining edge 12 is necessary.

If the optics units are washed with a high-pressure cleaner, then in addition to the already existing sealing effect, the housing is pressed, on the one hand, into the recess 11 with the flange 6 and, on the other, the lens element is pressed with the contact surface 10 against the shoulder 8, leading in each case to an enhancement of the sealing effect. The optics unit can be pressed into the interior of the equipment only by destruction.

The permanence of the connection is assured by virtue of the fact that, on the one hand, the area of plastic deformation is not directly exposed to weathering. Furthermore, materials are selected which are particularly resistant to UV radiation and weathering and either gradually reduce internal strains or survive them undamaged. Plexiglass is favorable for the lens elements and black polyamide or polycarbonate for the housing. Plexiglass is considerably harder and can therefore plastically deform the housing. The matrix plate is typically made from aluminum.

Because the housing is an enclosed cylinder, maximum stability is provided for the optics unit, on the one hand, and, on the other, the lens is also optimally protected against dust and the effects of extraneous light.

In order to remove a defective optics unit, the lens element 2 need merely be pushed out of the housing 1 from the back. Then the housing 1 can be knocked out of the hole 3. In this case the periphery 5 slips through the constriction because it can now yield inwards. Now a new optics unit can be mounted without additional preparation.

FIG. 4 shows a variation of the optics unit. The stamping 11 is not conical here, but rather somewhat curved. In this way a more precise alignment of the optics unit can be achieved. Likewise curved are the top sides of the housing and the lens element. The projecting lenses become contaminated less easily than flat surfaces, but because of the continuous surface no contaminants can build up. Thereby more favorable optical light distributions and characteristics can also be realized.

FIG. 5 shows an embodiment in which the contact surfaces 8 and 10 are displaced onto the top side of the housing 1. Thereby a maximal opening for the lens element is provided. Of course, a flat embodiment cannot be implemented in this way.

FIG. 6 shows for the sake of example an embodiment without any optical function. In place of the lens element a metal bolt 2 with threading is pressed in, which is used for mounting the matrix plate. The housing 1 has the function of a spacer. In a similar manner, sockets, detectors, dummy covers and so on can be installed flat and tightly in the matrix plate. Hollow lens elements or components can also be mounted in the same manner.

FIG. 7 shows that the hole shape and cross section of the optics unit can also be non-round, particularly if optics units with oriented light emission are to be protected against incorrect installation or twisting. For a vertically narrow but horizontally wide-scattering light distribution, for instance, an elliptical cross section makes sense; for an asymmetric emission direction, the optics unit must have only a single installation position (drop-shaped cross section). Geometries that are convex on all sides are particularly recommended. Polygonal cross sections are very difficult to seal at the corners.

FIG. 8 shows the opposite embodiment possibility. The optics unit is installed in the matrix plate from the inside and, even that way, offers a flat surface 13+14+15.

FIG. 9 shows the installation hole 3 in the matrix plate 4 before and after the application of the stamping 11. The production is accomplished particularly economically on a CNC nibbling machine by punching the hole and subsequently stamping the recess 11 or edge 12. By suitable selection of the angle Á and the type and size of the stamping 11, the manner of mounting presented can be adapted to different size, requirements and materials.

The precise execution of the mounting holes is very important for a precise orientation of the optics units. The manufacturing tolerances occurring in ordinary manufacturing can be eliminated by means of a suitable tool.

FIG. 10 shows a section through an embodiment presented for the sake of example of a suitable special stamping die. The stamping insert 21 producing the stamping 11 is retained so as to be laterally movable to a limited extent in a depression of the contact surface 23 with the aid of an O-ring 20 under slight initial tension. The precise positioning in relation to the contact surface 23 is possible by adding spacing rings 22 in the recess. The stamping insert 21 has the conical outer shape of the stamping 11 and possesses a projection 25 which calibrates the edge 12. The stamp 18 with the contact surface 23 is seated in the tool receptacle 24 so as to be movable axially by way of a cup spring 19 placed under tension with the nut 27.

At the beginning of the stamping process, the projection 25 first threads its way into the already existing hole 3 until the insert 21 touches the hole edge. In case of an eccentric position, the contact forces displace the conical insert 21 laterally until it is centered exactly on the hole 3 and makes contact along the entire hole edge. Now the actual stamping process begins, until the contact surface 23 comes to rest on the front side 15 of the matrix.

In case of proper adjustment, the edge 12 simultaneously also makes contact with the calibration projection 25 on all sides. The stamping process is thereby concluded. The compensation for thickness tolerances of the matrix plate 4 as well as the machine tolerance, however, requires a slight additional stroke motion of the tool receptacle 24, which is then absorbed by the cup spring 19. This latter has been placed under a sufficient initial tension by the nut 27 that it snaps in only after the completed stamping process and contact of the stamp on the matrix surface.

The limited lateral mobility of the insert 21 compensates for positioning tolerances which are caused by the machine itself, but also for slight changes in the matrix plate geometry due to warping or buckling from the punching stress as well as thermal expansions. The contact surface 23 ensures that the stamping stroke is always equally long, independently of the sheet metal thickness or thickness tolerance, the cup spring absorbing the excess feed motion.

In an embodiment variant, it is possible, depending on the type of machine, for the matrix 26 to deflect in place of the stamp 18. Of course, it is possible for the entire stamp 18 instead of the insert 21, to be seated so as to be laterally movable to a limit extent.

What is claimed is:

1. Optics unit for signaling, traffic and display equipment, preferably for mounting in matrix plates of signaling, display and traffic equipment, in particular, alternating traffic signs, consisting at least of a housing (1) of yielding material, preferably a tough plastic and the lens element (2) of solid material, wherein first the tubular housing (1) is pressed into a specially shaped hole (3) of the matrix plate (4) manufactured of solid material and then the lens element (2) is pressed into the housing (1), characterized in that, on the outside, the housing (1) has a cylindrical periphery (5) adapted to the hole geometry in the area of the matrix plate (4) with preferably adjacent insertion slope (5a) and a collar (6) serving as a contact surface and, internally, preferably at least one cylindrical area (7) in the area of the collar (6) and the adjacent periphery (5) as well as a stop surface (8) for the lens element (2), in that the lens element (2) features at least one cylindrical area (9) with adjacent insertion slope (9a) and a stop surface (10) in a geometry harmonizing with surfaces (7) and (8) of the housing (1), as well as in that the hole (3) has a recess (11) preferably produced by stamping with an edge (12) narrowing the hole cross section, in that, furthermore, the collar (6) lies against the stamping (11) upon installation of the housing (1) in the hole (3) and in the process the edge (12) preferably also constricts the collar (6) and the periphery (5) and in that, in the subsequent pressing of the lens element (2) into the housing (1), the surface (10) comes to rest against the surface (8), wherein, by an appropriate press-fit between the peripheral surfaces (7+9), the edge (12) of the hole (3) presses into the housing periphery (5), preferably by plastic deformation of the housing material, and thereby holds the optics unit in a form fit in the hole (3), positions it and seals it.

2. Arrangement according to claim 1, characterized in that the end face (13) of the collar (6) and/or the end face (14) of the lens element (2) are flat and, in the installed state, lie in a single surface with the front side (15) of the matrix plate (4).

3. Arrangement according to claim 2, characterized in that the end face (13) of the collar (6) and the end face (14) of the lens element (2) are arbitrarily shaped and, in the installed state, form as much as possible a closed, continuous surface with the front side (15) of the matrix plate (4).

4. Arrangement according to claim 1, characterized in that the stamping (11) is formed by a cone with the arbitrarily selectable angle Á.

5. Arrangement according to claim 1, characterized in that the flange (6) is adapted to the geometry of the stamping (11) in the installed state and completely fills out the space in the stamping.

6. Arrangement according to claim 1, characterized in that the hole wall (3), the hole stamping (11) and the narrowing of the hole by the edge (12) exhibit an essentially constant profile over the entire hole periphery.

7. Arrangement according to claim 1, characterized in that the wall thickness of the housing is essentially constant between the surfaces (5) and (7).

8. Arrangement according to claim 1, characterized in that the matrix hole cross section, the housing cross section as well as the lens cross section have a circular, elliptical or arbitrary other shape in the area of their connection.

9. Arrangement according to claim 1, characterized in that the cylindrical surfaces (5,7 and 9) are also constructed to be slightly conical such that the self-locking limits of the material pairs prevents the pressed-together components from slipping apart.

10. Arrangement according to claim 1, characterized in that housing (1) and lens element (2), in a modified design, in arbitrary size and/or of other materials, can satisfy arbitrary other non-optical purposes (e.g., as support and mounting bolts for the matrix plate (FIG. 6) or for leading through or fastening arbitrary other elements).

11. Method for producing a stamping according to claim 1, applicable to CNC nibbling machines, wherein the though-holes are punched in a conventional manner and in at least a second step where the stampings are produced by means of a special tool (FIG. 9), characterized in that the stamp (18) has a contact surface (23) and, in a central recess thereof, a stamping insert (21), preferably movable laterally to a limited extent, which automatically centers itself by way of the overall conical geometry of its external shape, corresponding to the stamping (11), on the existing hole (3) and the stamping depth of which can preferably be adjusted by way of spacing disks (22) exactly in relation to the contact surface (23) of the stamp (18) and in that the contact surface (23) can deflect in relation to the tool receptacle (24) by at least the thickness tolerance of the matrix plate.

12. Method according to claim 11, characterized in that a projection (25) is present on the stamping insert (21) which calibrates the edge (12) to an exact measure.

13. Method according to claim 11, characterized in that the deflection of the special stamp takes place only after stamping has been accomplished and contacting the contact surface (23) of the matrix plate (4).

14. Method according to claim 11, characterized in that the matrix (26) deflects instead of the special stamp.

15. Method according to claim 11, characterized in that, instead of the insert (21), the entire stamp (18) is seated so as to be movable laterally to a limited extent.

16. Method according to claim 11, characterized in that, by suitable selection of the geometry of the stamping (11) or the angle Á as a function of the material of the matrix plate (4), as well as by multiple application of the punching or stamping process, an exact stamping out of the edge (12) with sufficient constriction of the hole (3), on the one hand, and, on the other, as small a spacing as possible between adjacent optics units is achieved, without the holes (3) or the stampings (11) defining one another.

* * * * *